United States Patent [19]

Matsuoka et al.

[11] 3,723,039
[45] Mar. 27, 1973

[54] INTERNAL MIXER

[75] Inventors: James T. Matsuoka, Brecksville; Armindo Cantarutti, Akron, both of Ohio

[73] Assignee: Intercole Automation, Inc., Cleveland, Ohio

[22] Filed: Jan. 4, 1971

[21] Appl. No.: 103,537

Related U.S. Application Data

[63] Continuation-in-part of Ser. No. 841,349, July 14, 1969.

[52] U.S. Cl. ............425/204, 425/208, 425/209, 259/10, 259/26, 259/46
[51] Int. Cl. .............................................B29b 1/10
[58] Field of Search ..18/12 SP, 12 SM, 12 SS, 2 HA, 18/2 EM; 259/6, 7, 9, 10, 25, 26, 41, 45; 425/200, 201, 204, 205, 207, 208, 209, 376

[56] References Cited

UNITED STATES PATENTS

| | | | |
|---|---|---|---|
| 3,148,231 | 9/1964 | Spencer | 18/12 SS |
| 3,154,808 | 11/1964 | Ahlefeld et al. | 18/2 EM |

*Primary Examiner*—Robert L. Spicer, Jr.
*Attorney*—Watts, Hoffman, Fisher & Heinke

[57] ABSTRACT

An internal continuous mixer with parallel mixing rotors and a screw controlled discharge. Each rotor comprises a central bladed mixing portion, a screw infeed portion and a screw outfeed portion. The threads of the screw outfeed portion have nonuniform crest diameter thus working the material being mixed, and providing clearance permitting the material discharge rate to be controlled down stream therefrom as by an enclosed material conveyor or feed screw, preferably a screw extruder apparatus.

2 Claims, 3 Drawing Figures

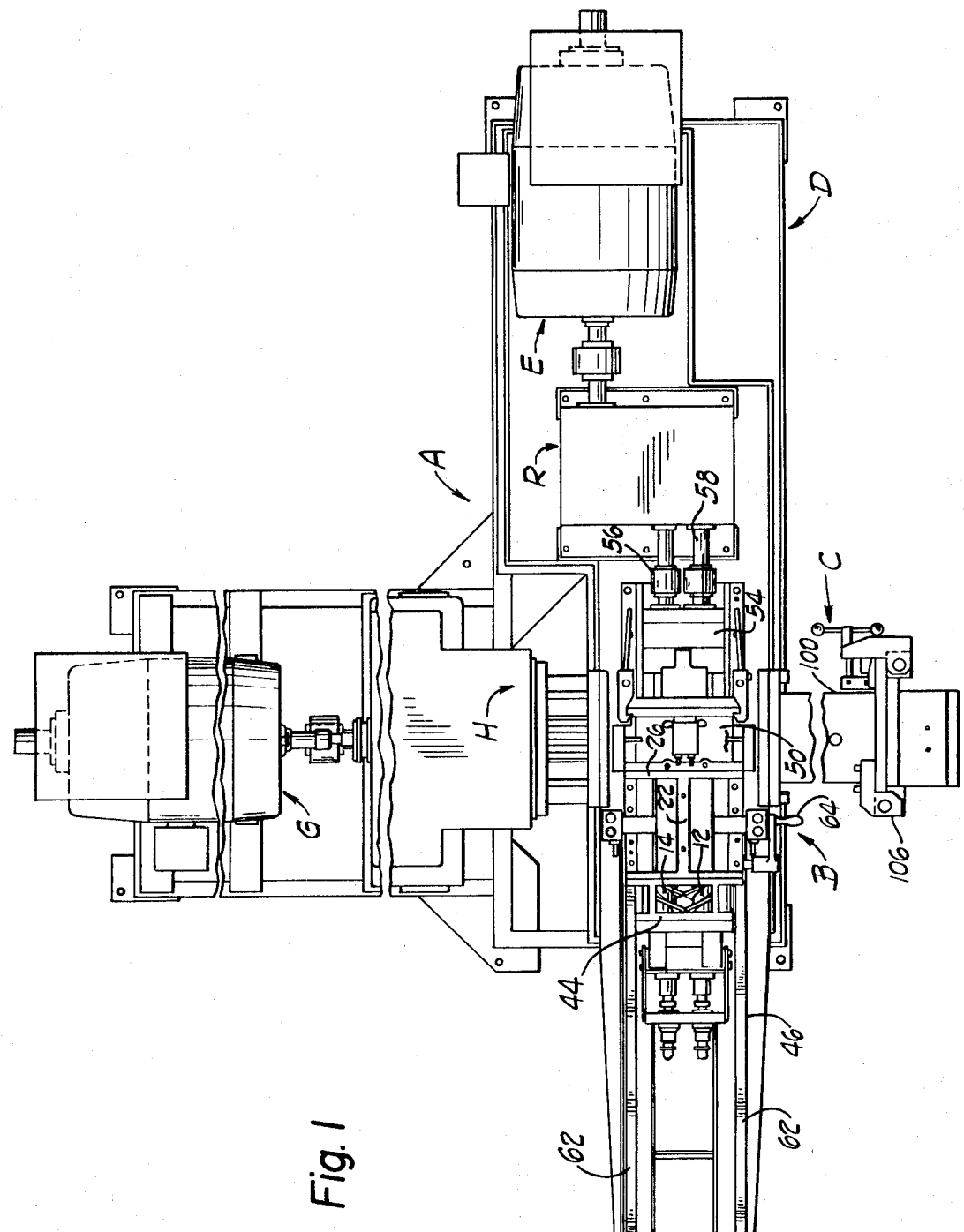

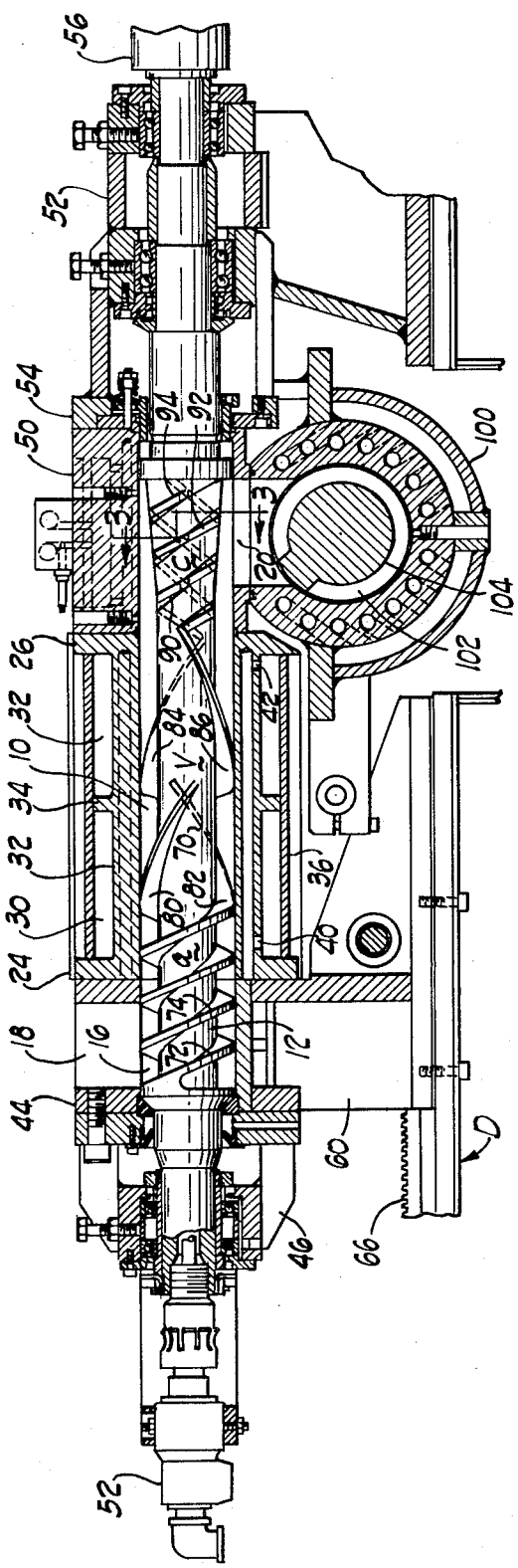

INTERNAL MIXER

RELATED APPLICATIONS

This application is a continuation-in-part of our co-pending application, Ser. No. 841,349, filed July 14, 1969, the disclosure of which is incorporated herein by reference.

FIELD OF THE INVENTION

This invention relates to a continuous internal mixer for mixing materials, such as plastics including rubber, and the like, and more particularly to a continuous mixer with twin rotors and a controlled discharge.

PRIOR ART

Internal mixers for continuously mixing materials within a chamber by the action of parallel rotors are known. In such mixers the intensity of the mixing, i.e., the work performed on or energy absorbed by the material, is a function of many variables including the rate of material throughflow which is typically controlled by adjusting the size of a restriction through which the material must pass in its flow from the mixing chamber.

SUMMARY OF THE INVENTION

The invention provides improved methods of and apparatus for mixing plastics including rubber, and the like, utilizing two parallel rotors in longitudinally communicating side-by-side cylindrical material processing chambers having an inlet at one end and an outlet at the other. Each rotor includes, in axial relationship, a bladed mixing section, and a screw-type combination mixing and outfeed section of nonuniform thread crest diameter. The screw outfeed sections or portions of the rotors assists in advancing the material being processed to the discharge opening and in the mixing of the material but do not provide positive feed of material. The discharge ends of the processing chambers communicate with a discharge conduit through which material being processed is conveyed by a screw, the rate of rotation of which controls the rate of flow of material being processed and in turn the intensity and/or amount of mixing, the back pressure upon the material within the mixing chamber, etc.

The discharge conduit communicating with the output end of the processing chambers and the screw therein preferably constitute or are a part of a screw extruder apparatus with the material being transferred from the mixing apparatus to the extruding apparatus without possibility of oxidation or other contamination. The transfer also takes place without loss of heat thus eliminating the necessity of reheating the material in the extruding apparatus thereby making it possible to use an extruder screw of less length than that which would otherwise be required.

The invention will be better understood and further advantages, as well as objects thereof, will become apparent from the accompanying drawing and ensuing description of the preferred embodiment of the invention.

BRIEF DESCRIPTION OF THE DRAWING

FIG. 1 is a fragmentary plan view of a continuous internal mixer with a screw controlled discharge embodying the present invention;

FIG. 2 is a fragmentary, longitudinal sectional view, with portions in elevation, of the continuous mixer shown in FIG. 1, taken along the line 2—2; and FIG. 3 is a fragmentary, sectional view approximately on the line 3—3 of FIG. 2.

DESCRIPTION OF A PREFERRED EMBODIMENT

The preferred embodiment of the invention, indicated generally in the drawings by reference character A, is a combination material mixing and extruding apparatus and includes a material mixing part B and an integral material screw-type extruding part C extending transversely of the mixing part all supported on a common base D. The rotors of the material mixing part of the apparatus B are driven by a motor E through a gear reducer R. From the part B the material being processed is discharged directly to the extruding part C of the processing apparatus. A motor G drives the extruder screw through a gear reducer H. The extruder C controls the flow or travel of the material through the apparatus in addition to extruding the processed material.

The mixing part B includes side-by-side, longitudinally communicating, generally cylindrical "mirror image" material processing chambers 10, 11 within which rotors 12 and 14 are located. The process chambers 10, 11 have a common inlet opening 16 at their left-hand ends, as viewed in the drawings, and which is at the bottom of a feed hopper 18. A common bottom discharge opening 20 communicates with the processing chambers 10, 11 at their opposite end. The rotors 12, 14 extend through the processing chambers 10, 11, in side-by-side relationship, one in each of the generally cylindrical chambers and are driven in counter rotation by the drive E. Each of the rotors has a screw infeed section, a bladed mixing section, and a screw outfeed section located or housed in corresponding sections of the processing chambers 10, 11. The screw-infeed sections of the rotors are below the inlet opening 16 at the bottom of the feed hopper and the screw outfeed sections overlie the discharge opening 20.

The mixing sections of the mixing chambers are formed in a cast housing 22 split horizontally and terminating at opposite ends in flanges 24, 26 with flat end faces. Parallel longitudinally extending drilled passages 28 are formed within the wall of the housing 22 closely adjacent the inner chamber-forming surface for the circulation of heat transfer fluid closely adjacent thereto. The lateral side of the upper housing member is divided longitudinally into inlet and outlet chambers 30, 32 by a vertical flange 34 that abuts on outer plate 36 secured to the end flanges 24, 26 and spaced from the housing wall adjacent thereto. Axially extending divider walls further divide the inlet and outlet chambers 30, 32 to control the flow of heat transfer fluid through the drilled passages 28. Two inlet manifold chambers are thus provided in the upper housing member between the end flange 26 and the central flange 34 and two discharge manifold chambers corresponding to the inlet manifold chambers are located between the central flange 34 and the end flange 24. The lower housing member or section is similarly divided into two inlet chamber manifolds by the end flange 26 and central flange similar to the flange 34, and two discharge manifold chambers between the central flange and end flange 24. The longitudinally extending drilled passages 28 communicate with the manifolds through apertures 40 at the inlet ends and 42 at the outlet ends.

The feed hopper 18 and the screw infeed sections of the mixing chambers are formed in a cast housing member 44 that abuts the adjacent end face of the housing 22 and at its opposite end face carries a bearing assembly 46 which supports the left-hand ends of the rotors 12, 14 as viewed in the drawings. The member 44 includes longitudinally spaced, transversely extending end walls and a central divider wall forming inlet and outlet chambers which communicate with passages (not shown) through which heat transfer fluid is circulated.

The screw outfeed sections of the mixing chambers are formed in a cast housing 50 interposed between the housing 22 and a bearing assembly 52 at the end of the apparatus opposite from the feed hopper 18. The bearing assembly 52 supports the right-hand ends of the rotors 12, 14. Drilled cooling passages extend longitudinally through the housing 50, close to and radially spaced about the major portion of the discharge sections of the mixing chambers for the circulation of heat transfer fluid about the discharge sections of the mixing chambers.

An adaptor assembly 54 attached to the left-hand end of each rotor 12, 14 provides for the circulation of heat transfer fluid through the rotors. The opposite ends of the rotors extend beyond the bearing assemblies 52 and each is connected by a coupling 56 to a drive shaft 58, from the gear reducer R.

The construction is such that the feed hopper, mixing chamber, and discharge housings can be moved as a unit relative to the rotors and to the extruder part of the apparatus for cleaning or repair of the rotors, etc. For this purpose, the housings 22, 44, 50 are supported on an auxiliary base 60 for sliding movement on parallel ways 62 on the main base D. Movement may be effected in any suitable manner as by a hand crank 64 carried by the auxiliary base and provided with a pinion in mesh with a rack 66 on the main base. The auxiliary base may be connected to the main base for rotation about a vertical axis, if desired, to provide greater access to the various parts.

Both rotors 12, 14 are of similar construction, differing only in that the mixing blades are twisted in opposite directions and corresponding blades are at different ends of the two rotor mixing portions, to provide the desired mixing action with counter rotation. Only the rotor 12, shown in FIG. 2, will be described in detail and the far rotor 14 will be referred to only to the extent necessary to point out the differences between the rotors.

Rotor 12 may be considered as having a generally cylindrical, body portion 70 provided with infeed screw threads on the part thereof below the feed hopper 18, mixing blades on the part thereof extending through the housing 22, and outfeed screw threads on the part in the housing 50. The infeed screw section of the rotor comprises double threads 72, 74 on the infeed screw portion or section of the body 70 and their right-hand ends terminate at or in helical housing 22 blades in the mixing. The threads 72, 74, shown, are of the square type and have a helical or lead angle of about 15° to 30°, preferably about 18°. Other thread constructions, however, may be employed.

In the preferred construction shown, the rotor 14 is provided with four mixing blades arranged in two pairs 80, 82 and 84, 86 at opposite ends of the housing 22. Each blade of a pair curves or twists about the rotor body, preferably helically, through an angle of about 50° to 60°, preferably about 56°, from an end of the housing 22 toward the center, in the same direction as the other blade of the pair. The blades of one pair, however, twist or curve in an opposite direction about the rotor from the other pair, so that both pairs twist away from the direction of rotor rotation, considered in the direction from the opposite ends of the rotor toward the center of the mixing portion. The blades of one pair are displaced angularly from the blades of the other so that inner ends are peripherally spaced. Preferably the lengths of the blades are such that the inner ends overlap axially of the rotor. The angular displacement between the inner ends of adjacent blades provides gaps through which material being mixed can back flow for remixing. The gaps extend radially inward to a depth that approximately corresponds to the peripheral extent of the basis cylindrical rotor body portion 70. The parts of the apparatus thus far described may be similar to the corresponding parts disclosed in somewhat more detail in our aforementioned copending application, entitled "Continuous Mixer," Ser. No. 841,349.

The material outfeed section or portion of the rotor 12 includes a double thread screw formed by helical threads 90, 92 extending radially from a tapered body portion of the rotor, the crests of which threads are slotted and of nonuniform diameter. The helical screw threads 90, 92 are spaced from the mixing blades 84, 86 respectively at the right-hand end of the housing 22. They may, however, be connected or joined, if desired. The tapered body portion of the rotor which carries the screw threads 90, 92, enlarges in cross section in the axial direction of material flow thereby progressively diminishing the effective volume of the outfeed section of the mixing chamber 10. The threads 90, 92 are of the square type, have a maximum diameter slightly less than the internal diameter of the outfeed section of the processing chamber, and the crest height thereof, that is, the projection of the threads from the body portion of the rotor, varies from end to end to produce an inefficient material feeding thread. This variation may be from zero and maximum thread diameter. The threads 90, 92 have a helex or lead angle of about 15° to 30° and have spaced short sections 94 of maximum thread diameter located about 180° apart with the height of the thread diminishing to zero therebetween. The length of the sections 94 of uniform maximum thread diameter of the thread shown are equal to about one fourth of the maximum thread diameter. Threads of other construction which allow the desired back flow of material thereby may be employed. The threads 90, 92 are what might be termed quiet inefficient material conveying threads and permit back flow of material relative to forward screw action while wiping in walls of the outfeed section of the chamber 10 free of material being processed. The rotor 14 is similar to the rotor 12 except that the screw threads and the mixing blades are of the opposite hand. Rotation of the rotors 12, 14 does not necessarily effect positive flow of material from the processing chambers 10, 11.

The extruder part C, at the outfeed end of the mixing part B, comprises a housing 100 having a cylindrical chamber 102 within which the screw 104 driven by the drive G is located and a die assembly 106 at the discharge end of the screw 104. The housing 100 is supported on the base D and is also detachably bolted to the mixing part B. The extruder screw 104 may be of any suitable construction and extends transversely of the rotors 12, 14 in the material processing chambers 10, 11. The extruder C may be similar to the extruder disclosed in the aforementioned copending application, Ser. No. 841,349.

In operation, material to be processed is introduced through the feed hopper 18 into the infeed sections of the two counter rotating rotors 12, 14 which are driven at a suitable speed by the mixer drive E. The infeed screws advances the material to the mixing sections of the rotors within the mixing chambers. Alternatively, the infeed screws may be omitted and the material introduced directly into the upstream end of the mixing chambers as by moving the infeed opening 16 down stream and/or extending the upstream mixing blades 80, 82 to the left, as viewed in the drawings. As the material moves into and through the mixing chamber, the blades of the mixing sections of the rotors work the material within the mixing chambers in a generally back and forth manner by virtue of the oppositely twisting blades on each rotor. In addition, the blades due to their high helix or lead angles preferably from about 75° to 80°, spread the material against the inside surfaces of the mixing chambers and shear the material between the blades and the walls of the mixing chambers. The peripherally displaced inner ends of the blades of each rotor by virtue of the axially overlapping relationship, permit a limited flow of material through the gaps between the inner ends so that the material will in part flow in a tortuous mixing path as it is worked by the blades. This provides an intermixing of the material on opposite sides of the blades.

Material within the mixing chambers progressively decreases in viscosity as it moves towards the discharge ends thereof and becomes a plastic mass. Its movement through the mixing chambers is in part effected by the mixing blades adjacent to the entrance parts of the mixing chambers exerting pressure thereon through the more viscous material in the entrance end of the mixing chamber and by the pull or drag thereon effected by the outfeed screws 90, 92 and the discharge screw 104. Lengthening the mixing blades at the entrance end of the mixing chamber relative to the blades at the discharge end enhances the flowthrough pressure exerted on the material being processed by the rotor mixing blades.

In the outfeed sections of the mixing chambers the material being processed is further worked by the outfeed screw threads 90, 92, the crest of which, as previously stated, are of nonuniform height or diameter. The construction is such that the interior wall of the outfeed sections of the mixing chambers are swept or substantially swept by those portions of the threads 90, 92 of maximum height or diameter and the material may flow back and forth relative to the length of the chamber by virtue of the clearance provided by the portions of the threads of less than maximum height or diameter. To this extent, as previously stated, the threads 90, 92 do not effect positive displacement of material in the outfeed chamber, and the rate of discharge of material from the mixing chambers 10, 11 is a function of the material requirement of the extruder C.

The mixing process produces heat and temperatures in the mixing part B which would be detrimental to the material being processed can be avoided or controlled by the circulation of heat transfer fluid through the drilled passages closely adjacent the inside surfaces of the processing chambers, as already mentioned. The independent control of supply and exhaust of heat transfer fluid to the various chambers permits maximum temperature control and flexibility to establish the required temperature at different locations within the apparatus.

As described above, an internal mixer with parallel mixing rotors and a screw controlled discharge has been provided in which the material throughput is affected by operation of a screw in a discharge conduit connected to the material processing chambers. In the preferred embodiment, the outfeed screw and the extruder screw operates upon the material being processed in addition to the rotor mixing blades in the mixing chamber, reducing total power requirements, permitting a reduction in the overall length of the extruder, and the direct feed of material from the mixing part B to the extruder part C eliminates all chances of contamination of the material during transfer of material from a discrete mixer the an extruder.

From the foregoing description of the preferred embodiment it will be apparent that the objects heretofore enumerated and others have been accomplished and that there has been provided a novel and improved apparatus for continuously processing plastic materials and the like utilizing oppositely rotating parallel rotors having so-called mixing blades followed by outfeed screws, the thread or threads of which are of varying height or maximum thread diameter and a metered discharge. While a particular outfeed thread design is illustrated and described, it is to be understood the changes therein may be made so long as there are voids, clearances or interruptions in the thread or threads to permit back flow of the material.

Having thus disclosed the invention, what is claimed is:

1. In a continuous internal mixer: a frame having two side-by-side interconnected substantially cylindrical material processing chambers having a first opening adjacent to one end through which material to be processed is charged and a second opening adjacent to the opposite end through which material is discharged; two material processing rotors, one in each of said chambers, supported for rotation therein each provided with pairs of material working blade portions in the central part of the mixing chamber oriented more lengthwise of the axis of the rotors than circumferentially thereof and twisting in opposite directions; a screw thread on each end of each of said rotors one being adjacent to the down stream end of the rotor; at least a portion of said screw thread adjacent to the down stream end having a varying crest height; said frame having a conduit connected in direct communication with said second opening for receiving material from said processing chamber; a rotatable screw extending axially in said conduit closely received therein and extending substantially the length thereof; an extrusion die at the discharge end of said conduit; and means to rotate said screw at a controlled rate to convey material away from said second opening and to force material axially along said conduit and through said extrusion die.

2. In a continuous internal mixer; a frame having two side-by-side interconnected substantially cylindrical material processing chambers having a first opening adjacent to one end through which material to be processed is charged and a second opening adjacent to the opposite end through which material is discharged; two material processing rotors, one in each of said chambers, supported for rotation therein and each having a central portion with material mixing blade; at least one of said rotors having first and second pairs of blades extending inward from opposite ends thereof, the blades of each pair being displaced one from the other approximately 180° circumferentially about the rotor, each pair extending in a generally opposite helical path toward the center of the rotor, the blades of the first pair being displaced peripherally about the rotor from the second pair, with the inner ends of the blades of the first pair being overlapped axially with respect to the inner ends of the blades of the second pair; a screw thread on each end of each of said rotors one being adjacent to the down stream end of the rotor; said screw thread adjacent to the down stream end having at least a verging portion of varying crest height; said frame having a conduit connected in direct communication with said second opening for receiving material from said processing chambers; a rotatable screw extending axially in said conduit closely received therein and extending substantially the length thereof; an extrusion die at the discharge end of said conduit; and means to rotate said screw at a controlled rate to convey material away from said second opening and to force material axially along said conduit and through said extrusion die.

* * * * *